(12) United States Patent
Grabau

(10) Patent No.: US 8,215,911 B2
(45) Date of Patent: Jul. 10, 2012

(54) WIND POWER PLANT WITH LIGHTNING PROTECTION ARRANGEMENT

(75) Inventor: Peter Grabau, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 943 days.

(21) Appl. No.: 11/992,962

(22) PCT Filed: Oct. 6, 2006

(86) PCT No.: PCT/DK2006/000560
§ 371 (c)(1),
(2), (4) Date: Sep. 23, 2008

(87) PCT Pub. No.: WO2007/038931
PCT Pub. Date: Apr. 12, 2007

(65) Prior Publication Data
US 2009/0129927 A1    May 21, 2009

(30) Foreign Application Priority Data
Oct. 6, 2005   (DK) .................................. 2005 01397

(51) Int. Cl.
*B63H 3/00*   (2006.01)
*F04D 29/38*  (2006.01)

(52) U.S. Cl. .................................. 416/146 R; 416/230
(58) Field of Classification Search ............. 416/146 R, 416/230, 241 R, 81, 82, 92, 134 R, 114, 194, 416/196 R, 99, 106, 107, 183, 195, 206, 214 R, 416/213 A, 225, 95, 1, 132 A
See application file for complete search history.

(56) References Cited

U.S. PATENT DOCUMENTS

| 6,402,472 B1 * | 6/2002 | Hogue et al. ............... 416/132 A |
| 7,071,578 B1 * | 7/2006 | Shibata et al. .................. 290/55 |
| 2003/0230898 A1 * | 12/2003 | Jamieson et al. ............... 290/55 |

FOREIGN PATENT DOCUMENTS

| JP | 2001-123934 A | 5/2001 |
| WO | 94/25752 A1 | 11/1994 |
| WO | 96/07825 A1 | 3/1996 |

* cited by examiner

*Primary Examiner* — A. Sefer
*Assistant Examiner* — Nikolay Yushin
(74) *Attorney, Agent, or Firm* — The Nath Law Group; Jerald L. Meyer; Robert T. Burns

(57) ABSTRACT

A wind power plant (1) having a lightning protection arrangement comprises a plurality of blades (2) extending radially outwards from a hub (3) and together with said hub forming the rotor. An electrically conductive lightning protection means (4) is arranged between two adjacent blades (2).

8 Claims, 5 Drawing Sheets

WIND POWER PLANT WITH LIGHTNING PROTECTION ARRANGEMENT

TECHNICAL FIELD

The present invention relates to a wind power plant having a lightning protection arrangement, where the wind power plant comprises a plurality of blades extending substantially radially outwards from a hub and together with said hub forming the rotor.

BACKGROUND ART

It is known to provide blades with lightning protection systems to protect them from strokes of lightning. As an example, WO 96/07825 discloses a lightning protection system, in which the blade tip is provided with a so-called lightning receptor of an electrically conductive material. This lightning receptor can "capture" a stroke of lightning and conduct the current through a lightning conductor downwards, said conductor extending in the longitudinal direction of the blade and being earthed via the hub. This system has proved to provide a particularly effective protection.

However, there is a risk of a flashover or sparkover from the lightning receptor or lightning conductor to pools of water on the blade, since water is electrically conductive. In this case, lightning current heats up the water, which may cause a "steam explosion". This may result in pressure increases sufficiently high to damage the blade. Flashovers may also occur because of deposits of, for example, particles from the air, salts or insects on the blade surfaces. The damages due to flashovers result in the blade having to be repaired or, in the worst case, exchanged, which is a time-consuming and expensive process, since carrying out repairs or blade exchanges is complicated, especially for offshore wind power plants.

Moreover, providing a lightning receptor and a lightning conductor in blades made of carbon fibres is problematic, as carbon fibres are typically electrically conductive as well.

The object of the invention is to provide a new and improved lightning protection arrangement for wind power plants.

DISCLOSURE OF INVENTION

According to the invention, the object is obtained by arranging an electrically conductive lightning protection means between two adjacent blades. Since the lightning protection means is positioned away from blade, the risk of a flashover to the blades is thus considerably reduced.

According to a preferred embodiment of the invention, the wind power plant comprises three blades and three lightning protection means. In a particularly preferred embodiment, the blades are shell bodies, preferably made of a polymer material reinforced with glass fibres or carbon fibres. The rotor is preferably mounted on a substantially horizontal main shaft.

According to the invention, the lightning protection means may be provided in the form of a longitudinal means extending substantially radially outwards from the hub. In this manner, the lightning protection means projects high up in the air, when the rotor is made to rotate by the wind. Since the lightning protection means is electrically conductive, a possible lightning stroke is "attracted" to strike said means, and the lightning current is led through the lightning protection means to the earthed hub. It is also conceivable to envisage embodiments with a spark gap between the hub and the lightning protection means.

According to a preferred embodiment of the invention, each lightning protection means is placed substantially in the middle between two adjacent blades. Hereby, the lightning protection means is positioned at the largest possible distance from the blades in the rotor plane, thereby minimizing the risk of a flashover to the blades.

According to the invention, the lightning protection means may be retained by a retaining means connected between the lightning protection means and at least one blade. The retaining means is preferably longitudinal and has the form of a cord, a wire or a rod.

According to a preferred embodiment of the wind power plant according to the invention, the lightning protection means is retained by means of a retaining means between said protection means and each of the adjacent blades.

The retaining means is preferably connected with the blade tips so that the retaining means is at the greatest possible distance from the hub of the wind power plant. The retaining means may be connected to the blades via a swivel joint and/or a spring member. Hereby, the retaining means can be used in connection with a pitch-controlled (control of the blade angle) wind power plant.

In a particular embodiment, the retaining means is made of a dielectric material at least in certain areas. In this way, it is ensured that the lightning current is not led across the blades. For example, the retaining means may be connected to the lightning protection means and the blades via an electrically insulating material, such as a connecting joint made of ceramics. Naturally, the entire retaining means may also be made of a dielectric material.

The retaining means may be resilient in at least certain areas. Alternatively, the retaining means may be made of a flexible material. Hereby, the retaining means are able to yield so that the lightning protection means is slightly movable.

According to a preferred embodiment of the invention, the lightning protection means is provided with an aerofoil-like profile. This may be, for example, a so-called drag reduction profile, where the profile has the form of a symmetrical drop. In this way, the wind resistance of the lightning protection means is reduced, and noise emission may be lowered. In some cases, even the lightning protection means may have special aerofoil profiles so that they contribute to the production of the wind power plant.

The lightning protection means may be longer than, shorter than or of essentially the same length as the blades. However, they have to be so long that lightning is not attracted to strike one of the blades.

According to a preferred embodiment of the invention, the ends of the lightning protection means opposite the hub are equipped with a lightning receptor, e.g. in the form of a so-called Franklin rod.

Moreover, the blade may be coated with a material minimizing deposits of e.g. particles from the air, salt water and insects on the blades. In this way, it is even less attractive for lightning to strike the blades.

BRIEF DESCRIPTION OF THE DRAWING

The invention is explained in detail below with reference to the drawing, in which.

BEST MODES FOR CARRYING OUT THE INVENTION

Figure 1:
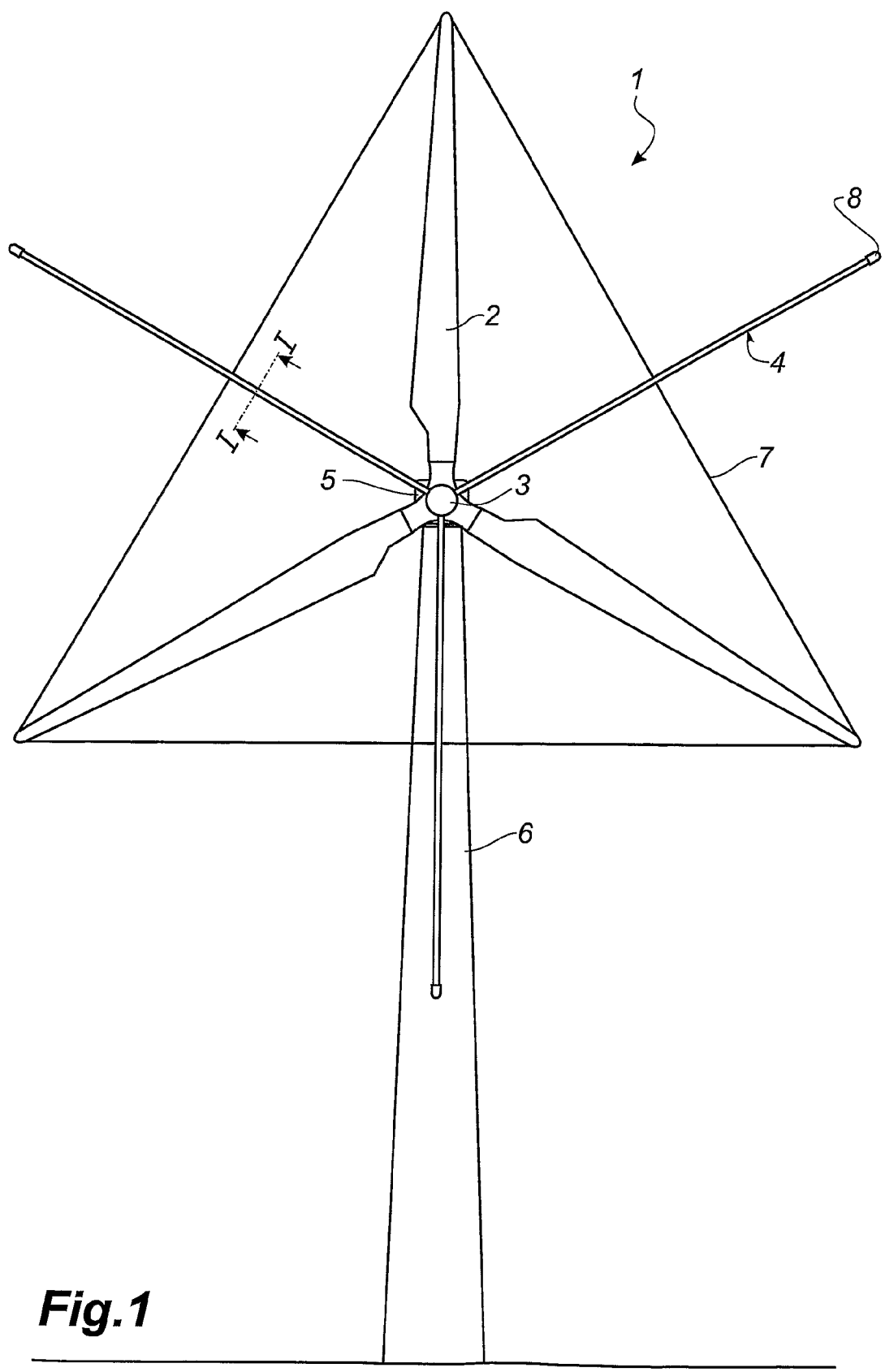
FIG. 1 is a schematic view of a first embodiment of a wind power plant according to the invention.
Figure 2:
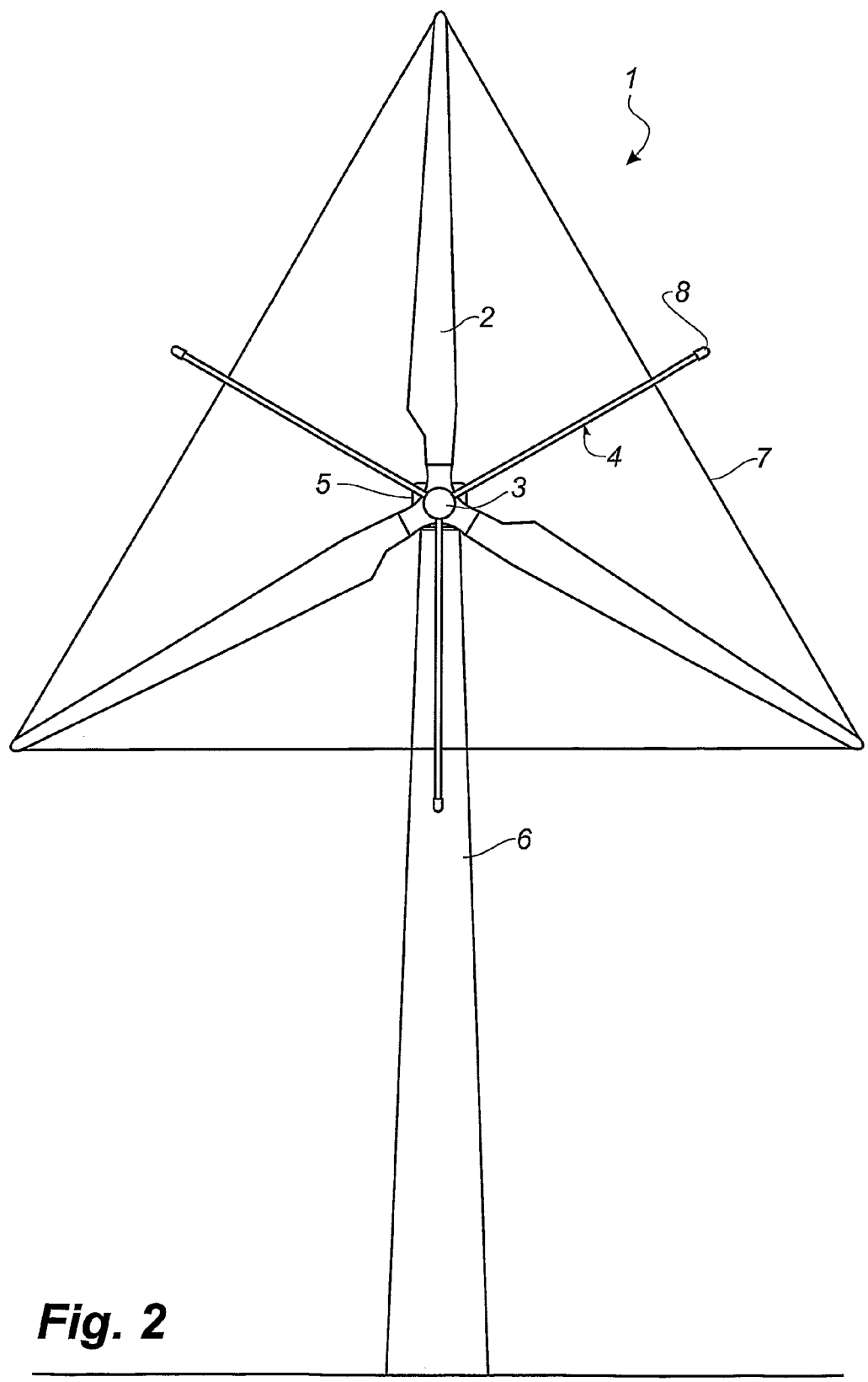
FIG. 2 shows a second embodiment of a wind power plant according to the invention.

The wind power plant 1 illustrated in FIG. 1 comprises a tower 6 supporting a nacelle 5, also called windmill housing. A substantially horizontal main shaft projects from the nacelle 5, a rotor being mounted on said shaft, said rotor comprising a hub 3 and a plurality of blades 2. The rotor can be made to rotate by the wind. Preferably, the wind power plant 1 is a so-called upwind plant, where the wind impinges on the rotor before it impinges on the tower 6, and where the nacelle 5 is able to yaw, i.e. rotate around a vertical axis with respect to the tower 6, the rotor thereby adjusting itself to the wind direction at any give moment. Moreover, as shown in FIG. 2, the wind power plant 1 is preferably provided with three blades 2 extending substantially radially outwards from the hub 3 and being formed as so-called shell bodies made of a polymer material reinforced with glass fibres or carbon fibres.

The characteristic feature of the wind power plant 1 shown in FIG. 1 is that it has three lightning protection means 4 in the form of longitudinal means extending radially outwards from the hub 3. Each lightning protection means 4 is equipped with a lightning receptor 8 made of tungsten, for example. In a preferred embodiment, the lightning receptor 8 is provided as a so-called Franklin rod. The lightning conductor portion of the lightning protection means 4 itself is electrically connected to the hub 3, and lightning current from lightning striking one of the lightning protection means 4 can thus be led to earth via the hub, said hub being earthed by means of a lightning conductor (not shown) connected to an earth rod by means of e.g. the tower and the nacelle. Alternatively, there may be a spark gap between the lightning protection means 4 and the hub 3. The lightning conductors and the earth rod may be copper conductors or made of any other electrically conductive material.

In the embodiment shown in FIG. 1, the lightning protection means 4 have substantially the same length as the blades 2. Thus, the lightning protection means 4 projects just as much into the air as the blades 2, when the rotor of the wind power plant 1 rotates. In this way, lightning is not attracted to strike one of the blades 2, since the lightning protection means 4 are better electrical conductors. The lightning protection means 4 are placed radially in the middle between two adjacent blades 2. In this way, the distance between a lightning protection means 4 and a blade 2 is maximized, thereby minimizing the risk of a flashover or a sparkover.

Each lightning protection means 4 is retained by a retaining means 7, preferably in the shape of a wire, or cord or a rod, said retaining means being fastened between two adjacent blades 2.

FIG. 2 shows a second embodiment of a wind power plant 1 according to the invention. According to this embodiment, the lightning protection means 4 are shorter than the blades 2. In this way, the lightning protection means 4 are retained in a more stable manner. Even though the lightning protection means 4 do not project as high up into the air during the rotation of the rotor, a lightning stroke is still "attracted" to strike one of the lightning protection means 4, since they are better electrical conductors than the blades 2.

Figure 3:
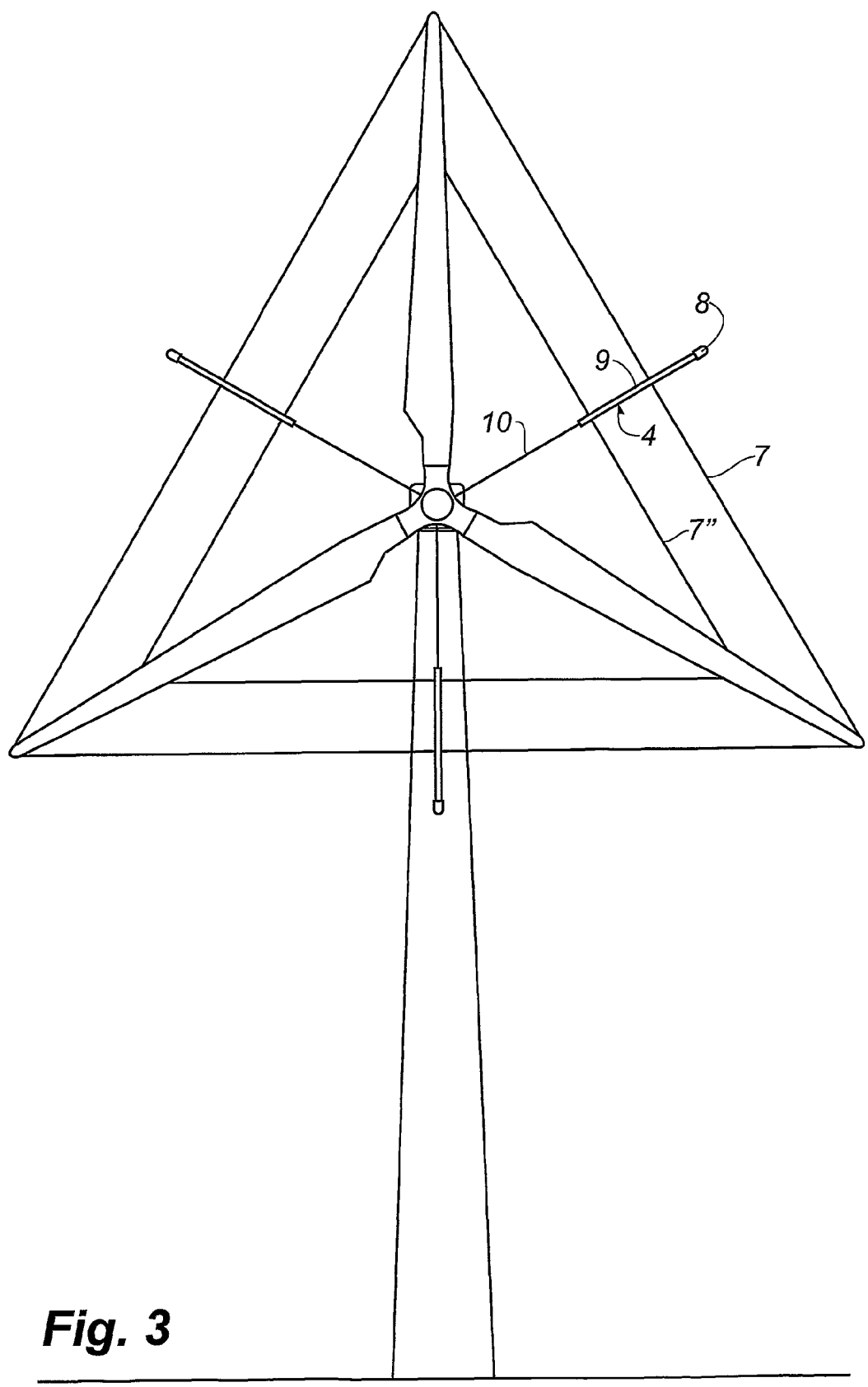
FIG. 3 shows a third embodiment of a wind power plant according to the invention.

FIG. 3 shows an embodiment where each of the lightning protection means 4 is divided into two with an outer rigid portion 9 and an inner flexible portion 10. The rigid portion 9 is retained by two wires 7, 7" ensuring that said rigid portion extends radially outwards from the hub 3. The flexible portion 10 may be a flexible, electric cable. In this way, the rigid portion 9 is able to move without subjecting the inner portion 10 of the lightning protection means 4 or the hub 3 to unnecessary loads.

Figure 4:
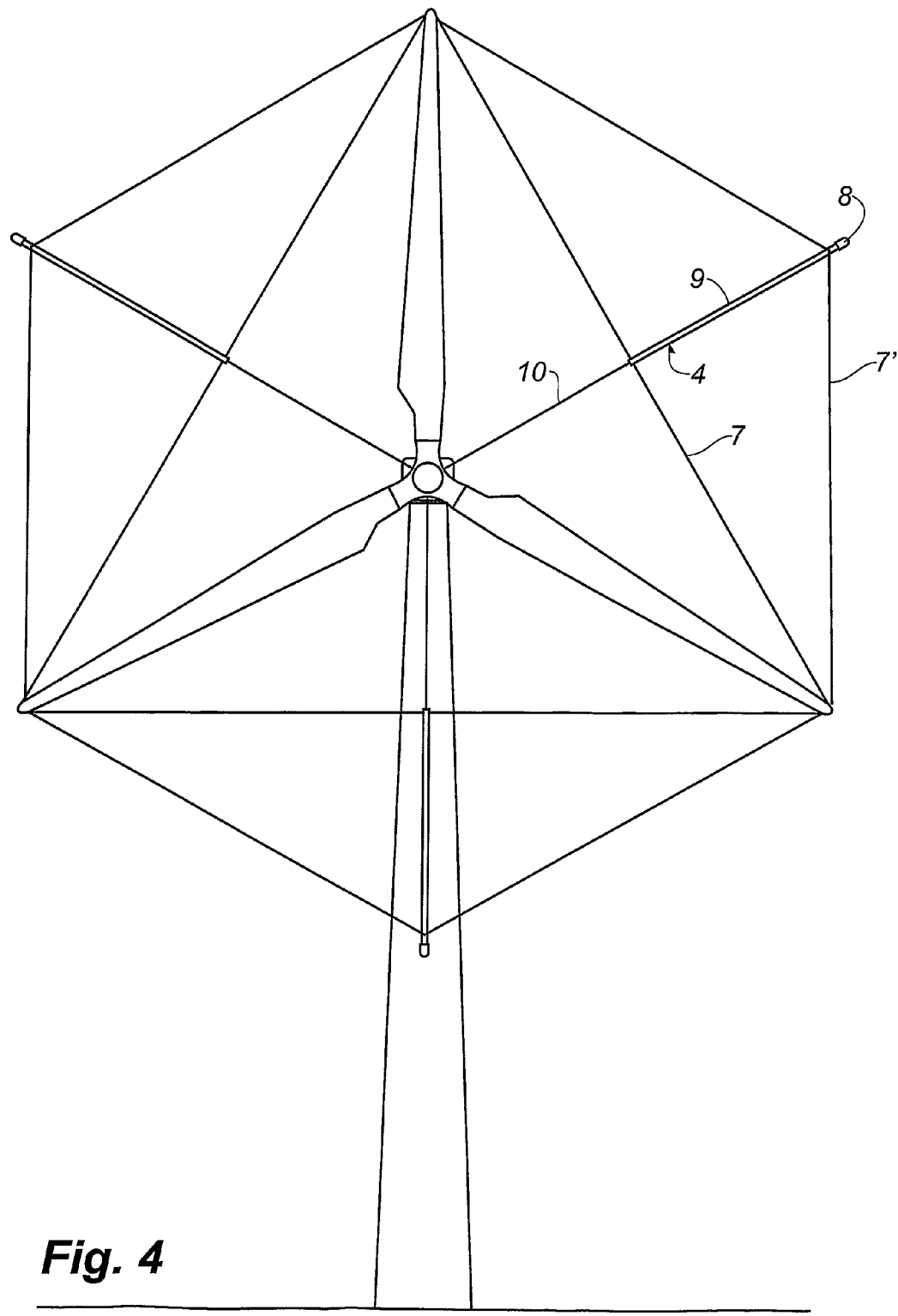
FIG. 4 shows a fourth embodiment of a wind power plant according to the invention.

The lightning protection means 4 of the embodiment shown in FIG. 3 are shorter than the blades 2, whereas FIG. 4 shows a corresponding embodiment where the lightning protection means 4 have substantially the same length as the blades 2. According to the embodiment shown in FIG. 4, the rigid portion 9 is again retained by two wires 7, 7'.

Figure 5:
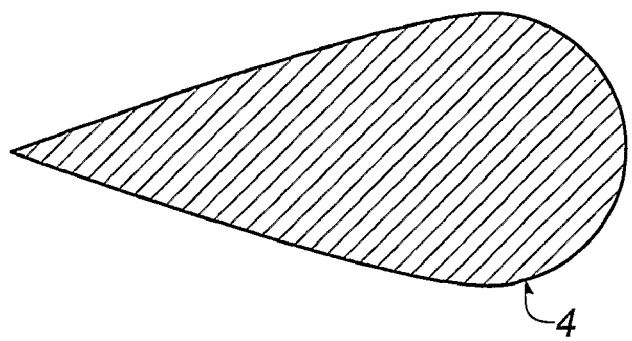
FIG. 5 is a sectional view along the line I-I in FIG. 1.

To reduce wind resistance of and noise pollution from the lightning protection means 4, they are preferably formed with a so-called drag reduction profile, as shown in FIG. 5, where the profile has the form of a symmetrical drop. However, the profile may also be provided with a conventional blade form or the like, so that the lightning protection means 4 contribute to the production of the wind power plant 1. The various profiles may be manufactured by moulding glass fibres around a cable. For example, the cable may have a cross-section area of 50 mm$^2$.

Figure 6:
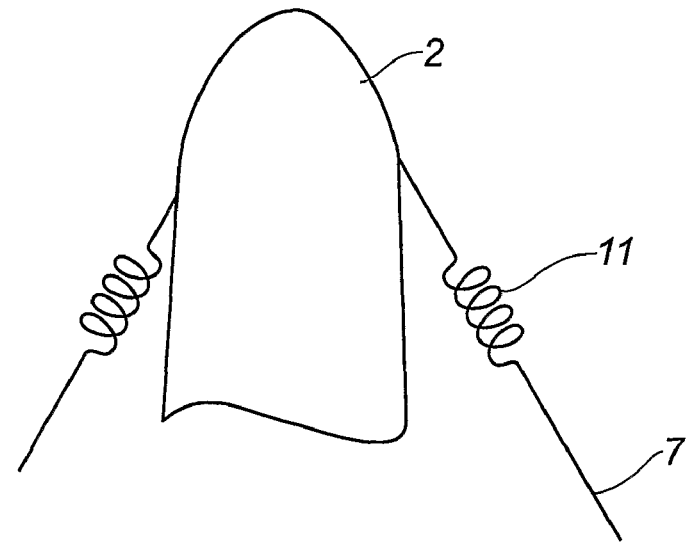
FIG. 6 shows a first embodiment of a connection between the blade tip and the retaining means.
Figure 7:
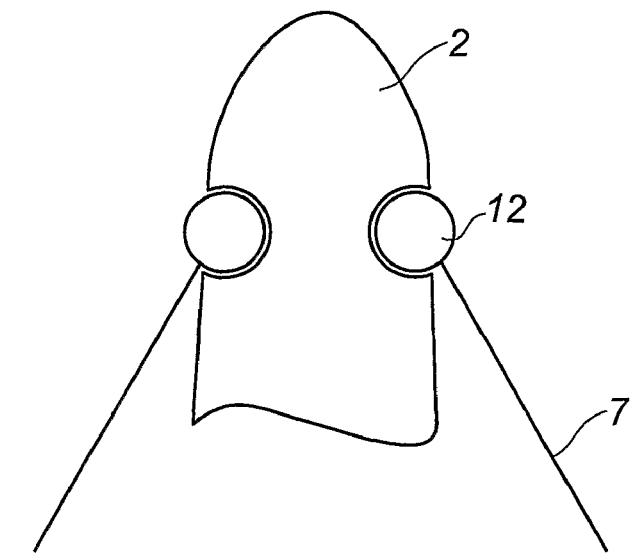
FIG. 7 shows a second embodiment of a connection between the blade tip and the retaining means.

In order to be able to use the lightning protection means 4 in connection with pitch-controlled wind power plants, the retaining means may be provided with a spring member 11 for yielding when the blades 1 are pitch-controlled, as shown in FIG. 6. The retaining means 7 may also be connected with the blade by means of a swivel joint or a ball joint 12. Naturally, the retaining means may comprise both a spring member 11 and a ball joint 12. Alternatively, the entire retaining means may be made of a flexible material so that it is able to yield when the blades 2 are pitch-controlled. This results in the lightning protection means 4 being able to move a little without any problems.

The connecting joints between the wires 7 and the blades 2 as well as between the wires 7 and the lightning protection means 4 may be made of a dielectric material, such as ceramics or a polymer material. Hereby, it is permissible that parts of the wires 7 may consist of for example a steel wire.

The invention has been described with reference to preferred embodiments. Many modifications are conceivable without thereby deviating from the scope of the invention. Modifications and variations obvious to those skilled in the art are considered to fall within the scope of the present invention. For example, two or more lightning protection means may be placed between two adjacent blades. Alternatively, the outer portion of the lightning protection means may be divided into two. The lightning protection means do not necessarily have to be placed between two adjacent blades, but may be closer to one of the blades. In this way, it is possible to increase the probability of a lightning protection means projecting beyond the blades at the moment a flash of lightning strikes.

REFERENCE NUMERAL LIST 1 wind power plant
2 blade
3 hub
4 lightning protection means
5 nacelle
6 tower 7 retaining means/wire/rod
8 lightning receptor
9 rigid portion
10 flexible portion
11 spring member
12 swivel joint/ball joint

The invention claimed is:

1. A wind power plant having a lightning protection arrangement, where the wind power plant comprises:
   at least three blades extending substantially radially outwards from a hub and together with said hub forming a rotor,
   characterized in that an electrically conductive lightning protection means is arranged between each two adjacent blades.

2. The wind power plant according to claim 1, characterized in that the lightning protection means is provided in the form of a longitudinal means extending substantially radially outwards from the hub.

3. The wind power plant according to claim 1, characterized in that each lightning protection means is placed substantially in the middle between each two adjacent blades.

4. The wind power plant according to claim 1, characterized in that the lightning protection means is retained by a retaining means connected between the lightning protection means and at least one blade.

5. The wind power plant according to claim 4, characterized in that the lightning protection means is retained by a retaining means between said lightning protection means and each two adjacent blades.

6. The wind power plant according to claim 4, characterized in that the retaining means is made of a dielectric material at least in certain areas, so that the lightning protection means and the blades are mutually electrically insulated.

7. The wind power plant according to claim 4, characterized in that the retaining means is resilient in at least certain areas.

8. The wind power plant according to claim 7, characterized in that the retaining means is made of a flexible material.

* * * * *